(12) United States Patent
Nagae et al.

(10) Patent No.: US 7,373,299 B2
(45) Date of Patent: May 13, 2008

(54) VARIABLE VOICE RATE APPARATUS AND VARIABLE VOICE RATE METHOD

(75) Inventors: Hisayoshi Nagae, Kawasaki (JP); Kohei Momosaki, Kawasaki (JP); Masahide Ariu, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 744 days.

(21) Appl. No.: 10/743,085

(22) Filed: Dec. 23, 2003

(65) Prior Publication Data
US 2004/0193423 A1 Sep. 30, 2004

(30) Foreign Application Priority Data
Dec. 27, 2002 (JP) .............................. 2002-382385

(51) Int. Cl.
*G10L 13/06* (2006.01)
(52) U.S. Cl. ...................... 704/267; 704/260; 704/235
(58) Field of Classification Search ................ 704/235, 704/260, 258, 270, 243, 266, 261, 276, 267, 704/231, 278
See application file for complete search history.

(56) References Cited
U.S. PATENT DOCUMENTS
6,665,641 B1 * 12/2003 Coorman et al. ........... 704/260
6,785,649 B1 * 8/2004 Hoory et al. ............... 704/235

FOREIGN PATENT DOCUMENTS

| JP | 1-255899 | 10/1989 |
|---|---|---|
| JP | 2513266 | 4/1996 |
| JP | 8-212228 | 8/1996 |
| JP | 8-297499 | 11/1996 |
| JP | 2001-155467 | 6/2001 |
| JP | 3219892 | 8/2001 |

* cited by examiner

*Primary Examiner*—Huyen X. Vo
(74) *Attorney, Agent, or Firm*—Oblon, Spivak, McClelland, Maier & Neustadt, P.C.

(57) ABSTRACT

A variable voice rate apparatus to control a reproduction rate of voice, includes a voice data generation unit configured to generate voice data from the voice, a text data generation unit configured to generate text data indicating a content of the voice data, a division information generation unit configured to generate division information used for dividing the text data into a plurality of linguistic units each of which is characterized by a linguistic form, a reproduction information generation unit configured to generate reproduction information set for each of the linguistic units, and a voice reproduction controller which controls reproduction of each of the linguistic units, based on the reproduction information and the division information.

7 Claims, 11 Drawing Sheets

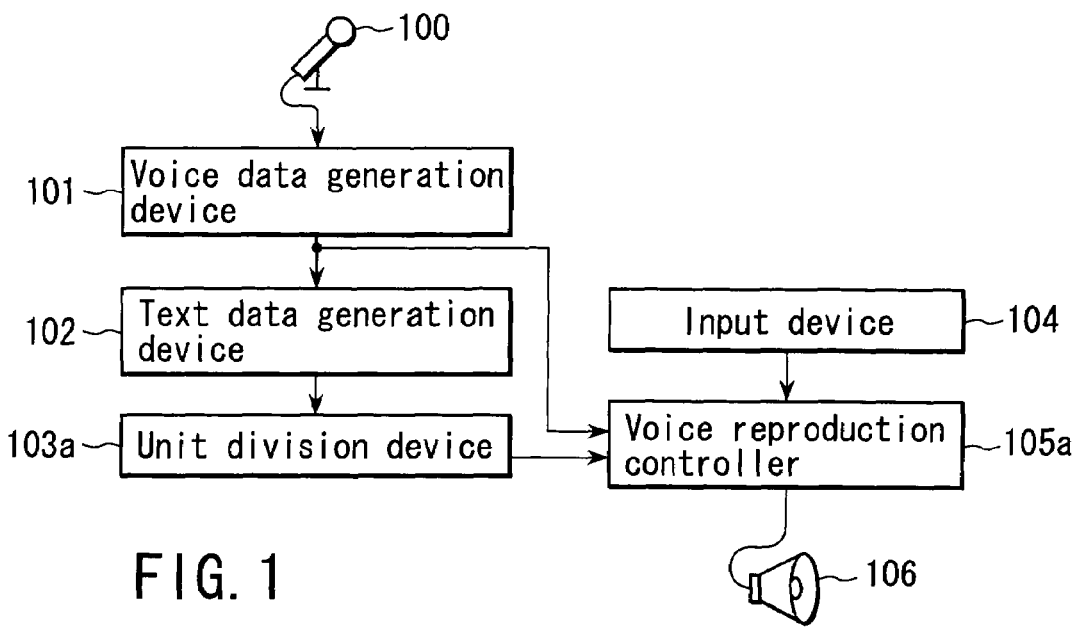

FIG. 1

Let me see, (sl) AAA will support increased production (sl) by expanding outsourcing well,
(sl) including manufacturing at BBB, Ltd (sl).
　　　　　　　　　　　(sl) represents a silent perform.

FIG. 2

```
    4        2    3          4      2      3        3
Let me see,/(sl)/AAA/Corporation/will/support/increased
    4            4    4          4
/production/(sl)/by/expanding/outsourcing.
  2    2        4            4      1    3   3   3
/well,/(sl)/including/manufacturing/at/BBB,/Ltd/(sl)./
```

"/" represents the break point of each unit.

FIG. 3

Noun, verb, mumber : 1.0
Adjective, adverb, pronoun : 0.6
Preposition, article, auxiliary verb, verb "to be" : 0.3
Interjection, silent word : 0.1

```
      0.1   0.1 1.0       1.0      0.3    1.0       0.6
Let me see,/(sl)/AAA/Corporation/will/support/increased
       1.0    0.1  0.3   0.6          1.0
/production/(sl)/by/expanding/outsourcing.
  0.1  0.1      0.6         1.0        0.3 1.0   0.1
/well,/(sl)/including/manufacturing/at/BBB,/Ltd/(sl)./
```

FIG. 6

| Noun, verb, number | $\frac{10}{10} \times 3 \times 40 \div 60 =$ double rate |
| Adjective, adverb, pronoun | $\frac{10}{6} \times 3 \times 40 \div 60 =$ 3.3-times rate |
| Preposition, article, auxiliary verb, verb "to be" | $\frac{10}{3} \times 3 \times 40 \div 60 =$ 6.7-times speed |
| Interjection, silent word | $\frac{10}{1} \times 3 \times 40 \div 60 =$ 20-times rate |

FIG. 7

```
    0.2      0.1 1.5       2       0.3      1.5        0.9
Let me see,/(sl)/AAA/Corporation/will/support/increased
     2    0.2 0.15 1.2         2
/production/(sl)/by/expanding/outsourcing.
  0.1  0.1     1.2        2        0.15 1.5   0.15
/well,/(sl)/including/manufacturing/at/BBB,/Ltd/(sl)./
```

```
AAA Corporation announced that it would meet fast increasing
demand for its 0.6-inch HDD by doubling production to
900,000 units per a month by March 2014.
```

FIG. 10

```
AAA | Corporation | announced | that | it | would | meet |fast
| increasing | demand | for | its | 0.6-inch |
| HDD | by | doubling | production | to | 900,000 | units
| per | a | month | by | March | 2014. |
        ("|" represents the break point of each basic block)
```

FIG. 11

```
AAA |              | announced |      | it |        | meet |
| increasing |     | for |       | 0.6-inch |
|      | by |      | production |     | 900,000 |
| per |    | month |   | March |       |
```

FIG. 12

AAA Corporation announced that it would meet fast [increasing] demand for its 0.6-inch [HDD] by doubling [production] to 900,000 units per a month by March 2014.

The innovative drive, a winner since its 2010 launch, delivers high-performance, high-capacity storage in a small form factor that has supported creation of today's new breed of consumer electronics devices and mobile products.

The drive's versatillity is reflected in the recent achievement of cumulative [production] of million units on consistently rising demand.

AAA Corporation will support [increased][production] by expanding outsourcing, including manufacturing at BBB, Ltd.

FIG. 15

AAA Corporation announced that it would meet fast demand for 0.6-inch hard disk drives (HDD) by doubling to 300,000 units per a month by March 2014.

AAA Corporating will support increased production by expanding outsourcing, including manufacturing BBB Corporation.

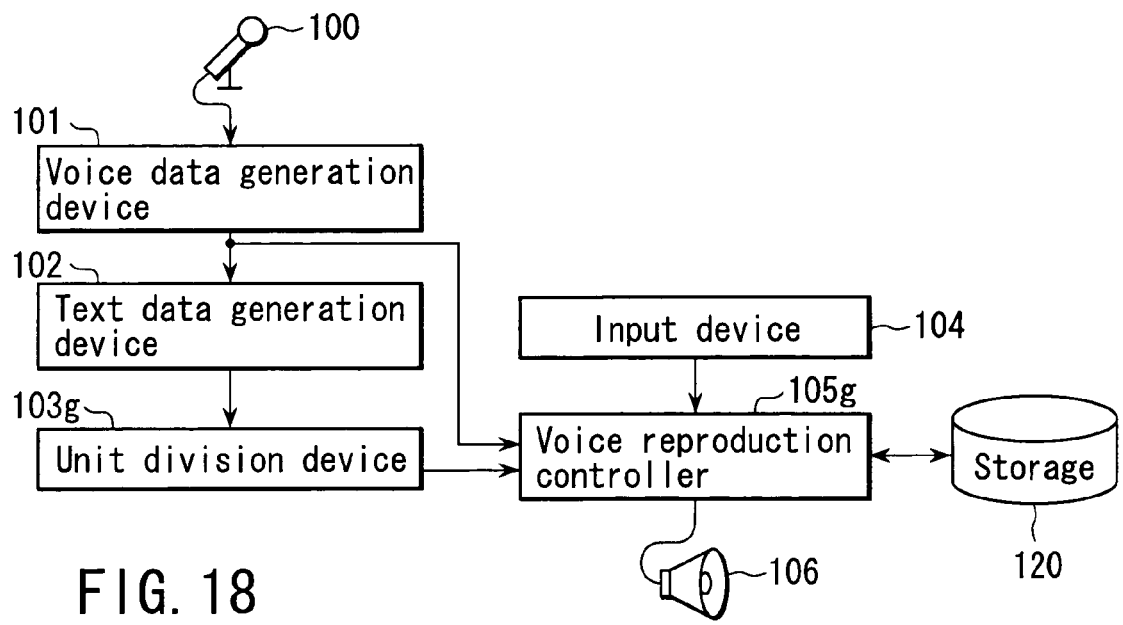

FIG. 18

(High) However, accordingly, firstly
(Intermediate) Further, while, but
(Low) For example, by the way, if

FIG. 19

(1) Firstly,...        :utterance time of 10 sec.
(2) Here,...           :utterance time of 10 sec.
(3) Further,...        :utterance time of 15 sec.
(4) if,..              :utterance time of 10 sec.
(5) For example,...    :utterance time of 10 sec.
(6) However,           :utterance time of 10 sec.
(7) For example,...    :utterance time of 10 sec.
(8) Accordingly,...    :utterance time of  5 sec.
                       (Total utterance time of 80 sec.)

FIG. 20

(1) Firstly,...        :utterance time of 10 sec.
(3) Further,...        :utterance time of 15 sec.
(6) However,           :utterance time of 10 sec.
(8) Accordingly,...    :utterance time of  5 sec.
                       (Total utterance time of 40 sec.)

FIG. 21

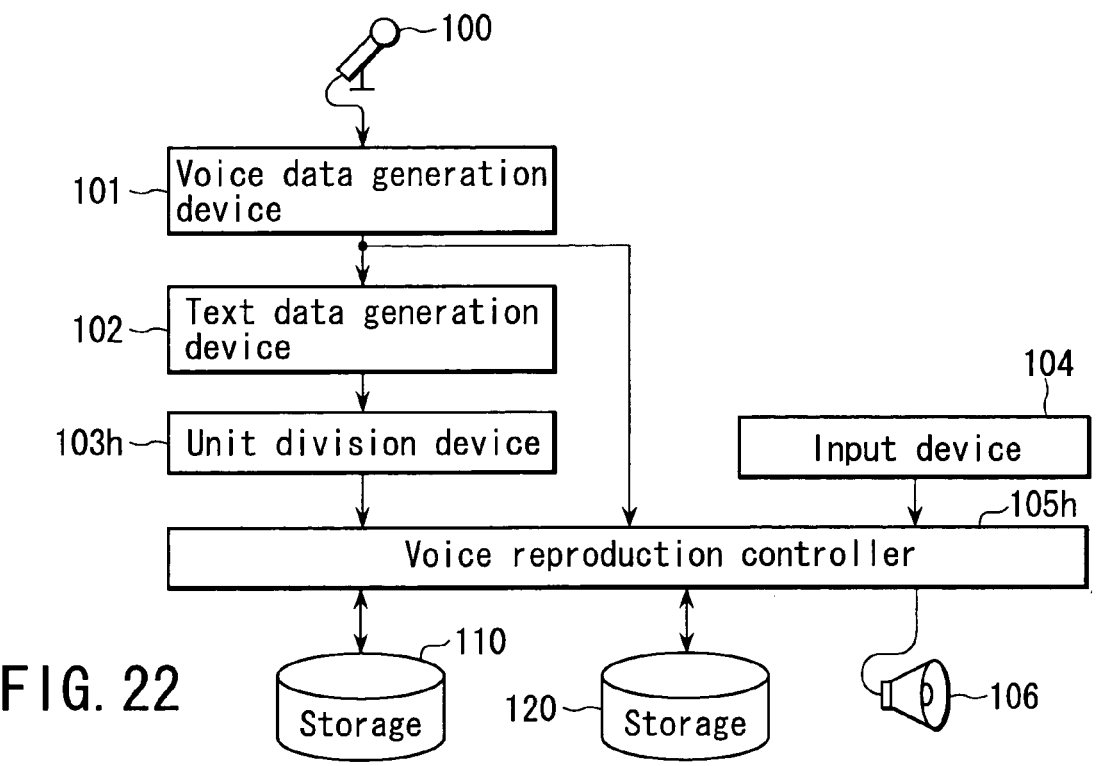
FIG. 22
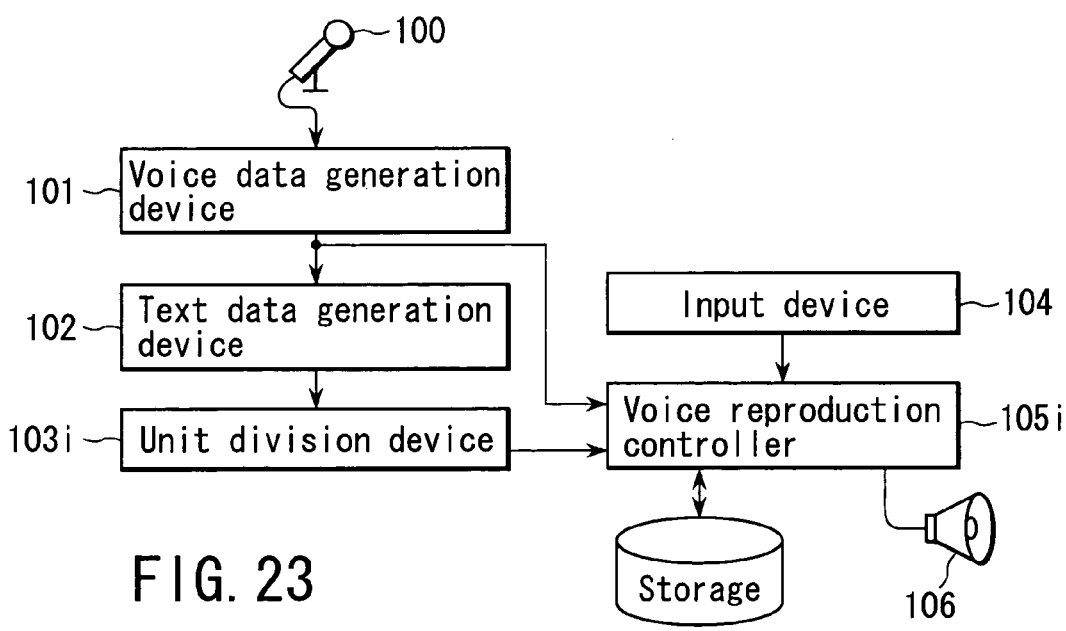
FIG. 23
AAA Corporation announced that it would meet fast increasing demand for its 0.6-inch HDD by doubling production to 900,000 units per a month by March 2014.
FIG. 24

FIG. 25

| Number | | Probability | Utterance time (sec) |
|---|---|---|---|
| (1) | AAA | 0.001 | 3 |
| (2) | AAA Corporation | 0.2 | 2 |
| (3) | Corporation announced | 0.01 | 3 |
| (4) | announced that | 0.1 | 2 |
| (5) | that it | 0.2 | 1 |
| (6) | it would | 0.3 | 2 |
| (7) | would meet | 0.05 | 1 |
| (8) | meet fast | 0.1 | 2 |
| (9) | fast increasing | 0.02 | 2 |
| (10) | increasing demand | 0.05 | 2 |
| (11) | demand for | 0.2 | 1 |
| (12) | for its | 0.1 | 1 |
| (13) | its 0.6-inch | 0.002 | 4 |
| (14) | 0.6-inch HDD | 0.01 | 3 |
| (15) | HDD by | 0.2 | 1 |
| (16) | by doubling | 0.01 | 2 |
| (17) | doubling production | 0.01 | 3 |
| (18) | production to | 0.2 | 1 |
| (19) | to 900,000 | 0.001 | 4 |
| (20) | 900,000 units | 0.1 | 2 |
| (21) | units per | 0.1 | 1 |
| (22) | per a | 0.1 | 1 |
| (23) | a month | 0.05 | 2 |
| (24) | month by | 0.2 | 1 |
| (25) | by March | 0.05 | 2 |
| (26) | March 2014. | 0.002 | 3 |
| | Total | | 52 |

FIG. 26

| AAA | announced | 0.6-inch HDD | doubling production | 900,000 | 2014 | Total 25 (sec) |
|---|---|---|---|---|---|---|
| 3 | 3 | 2 | 3 | 4 | 3 | |
| 3 | 4 | 3 | 2 | 3 | 3 | |

VARIABLE VOICE RATE APPARATUS AND VARIABLE VOICE RATE METHOD

CROSS-REFERENCE TO RELATED APPLICATIONS

This application is based upon and claims the benefit of priority from the prior Japanese Patent Application No. 2002-382385, filed Dec. 27, 2002, the entire contents of which are incorporated herein by reference.

BACKGROUND OF THE INVENTION

1. Field of the Invention

The present invention relates to a variable voice rate apparatus for varying the rate of reproduced voice in, for example, video and audio apparatuses and medical instruments.

2. Description of the Related Art

The mainstream apparatuses that handle voice data or voice data related to video data have recently shifted from magnetic tapes to magnetic optical disks or semiconductor memories. Accordingly, the recording system has shifted from the analog system to the digital system.

Digital voice-recording systems facilitate the control of the rate of reproduced voice. Voice data can be caught more quickly by its quicker reproduction than the recording rate, or more slowly and clearly by its slower reproduction.

Some of the recent audio apparatuses and some voice reproduction application software for use in personal computers have a function for varying the rate of reproduced voice data, utilizing the features of digital voice data.

This function uses methods for controlling voice data based on the features of its waveform data. The methods include, for example, a method for uniformly shortening the time required for reproducing the waveform data of digitized voice data, and a method for generating, based on its waveform data, voice data whose reproduction time is shortened, and a method for intermittently skipping the reproduction of voice data. Further, a method is also included in which silent portions are detected in voice data, and the time required for reproducing the voice data is shortened by excluding the silent portions (see, for example, Published Japanese Patent No. 3219892, pages 4-9 and FIG. 1).

However, in the above-described conventional method for shortening the reproduction time of voice data, the rate of reproduction cannot be greatly increased, since no one can follow the reproduced data if the rate is too high.

Further, in the method for intermittently skipping the reproduction of voice data, the meaning of the data may not be understood. If voice data contains few silent portions, the method for erasing silent portions is not so advantageous.

As described above, in the conventional methods, since control is performed based on the acoustic features of voice data, it is often difficult to understand reproduced voice data.

BRIEF SUMMARY OF THE INVENTION

The present invention has been developed in light of the above, and aims to provide a variable voice rate apparatus and variable voice rate method that reproduce voice data that is easy to understand, even if the reproduction rate is varied or the time required for reproduction is shortened.

According to a first aspect of the invention, there is provided a variable voice rate apparatus to control a reproduction rate of voice, comprising: a voice data generation unit configured to generate voice data from the voice; a text data generation unit configured to generate text data indicating a content of the voice data; a division information generation unit configured to generate division information used for dividing the text data into a plurality of linguistic units each of which is characterized by a linguistic form; a reproduction information generation unit configured to generate reproduction information set for each of the linguistic units; and a voice reproduction controller which controls reproduction of each of the linguistic units, based on the reproduction information and the division information.

According to a second aspect of the invention, there is provided a variable voice rate apparatus to control a reproduction rate of voice, comprising: a reproduction information generation unit configured to generate reproduction information, the reproduction information being set for each of a plurality of linguistic units into which voice data is divided, each of the linguistic units being characterized by a linguistic form; and a voice reproduction controller which controls reproduction of each of the linguistic units, based on the reproduction information and division information which is used for dividing the voice data into the linguistic units.

According to a third aspect of the invention, there is provided a variable voice rate method of controlling a reproduction rate of voice, comprising: generating voice data from the voice; generating text data indicating a content of the voice data; generating division information used for dividing the text data into a plurality of linguistic units each of which is characterized by a linguistic form; generating reproduction information set for each of the linguistic units; and controlling reproduction of each of the linguistic units, based on the reproduction information and the division information.

BRIEF DESCRIPTION OF THE SEVERAL VIEWS OF THE DRAWING

FIG. 1 is a block diagram illustrating the configuration of a variable voice rate apparatus according to a first embodiment of the invention;

FIG. 2 shows an example of text data, into which the variable voice rate apparatus of FIG. 1 converts a voice signal input by a user;

FIG. 3 is a view useful in explaining the operation of dividing, into units, the text data generated by the variable voice rate apparatus of FIG. 1;

FIG. 4 shows examples of reproduction information imparted to respective parts of speech by the variable voice rate apparatus of FIG. 1;

FIG. 5 shows an example of text data related to reproduction information by the variable voice rate apparatus of FIG. 1;

FIG. 6 shows examples of reproduction rates set for respective parts of speech by the variable voice rate apparatus of FIG. 1;

FIG. 7 shows an example of correspondency between respective parts of text data and the times required for reproducing the parts, computed by the variable voice rate apparatus of FIG. 1;

FIG. 10 shows an example of text data, into which the variable voice rate apparatus of FIG. 9 converts a voice signal input by a user;

FIG. 11 is a view useful in explaining the operation of dividing, into units, the text data generated by the variable voice rate apparatus of FIG. 9;

FIG. 12 is a view useful in explaining the operation of the variable voice rate apparatus of FIG. 9 to select to-be-reproduced voice data;

FIG. 15 is a view useful in explaining the operation of the variable voice rate apparatus of FIG. 14 to select units including keywords;

FIG. 18 is a block diagram illustrating the configuration of a variable voice rate apparatus according to a seventh embodiment of the invention;

FIG. 19 shows an example of priority concerning the keywords to which the variable voice rate apparatus of FIG. 18 pays notice;

FIG. 20 shows examples of times required for reproducing respective units, detected by the variable voice rate apparatus of FIG. 18;

FIG. 21 shows examples of units selected by the variable voice rate apparatus of FIG. 18 to reproduce them;

FIG. 22 is a block diagram illustrating the configuration of a variable voice rate apparatus according to an eighth embodiment of the invention;

FIG. 23 is a block diagram illustrating the configuration of a variable voice rate apparatus according to a ninth embodiment of the invention;

FIG. 24 shows an example of text data, into which the variable voice rate apparatus of FIG. 23 converts a voice signal input by a user;

FIG. 25 shows examples of analysis results obtained by the variable voice rate apparatus of FIG. 23 concerning the occurrence probability of combinations of serial units;

FIG. 26 shows examples of units selected by the variable voice rate apparatus of FIG. 23 to reproduce them.

DETAILED DESCRIPTION OF THE INVENTION

Figure 8:
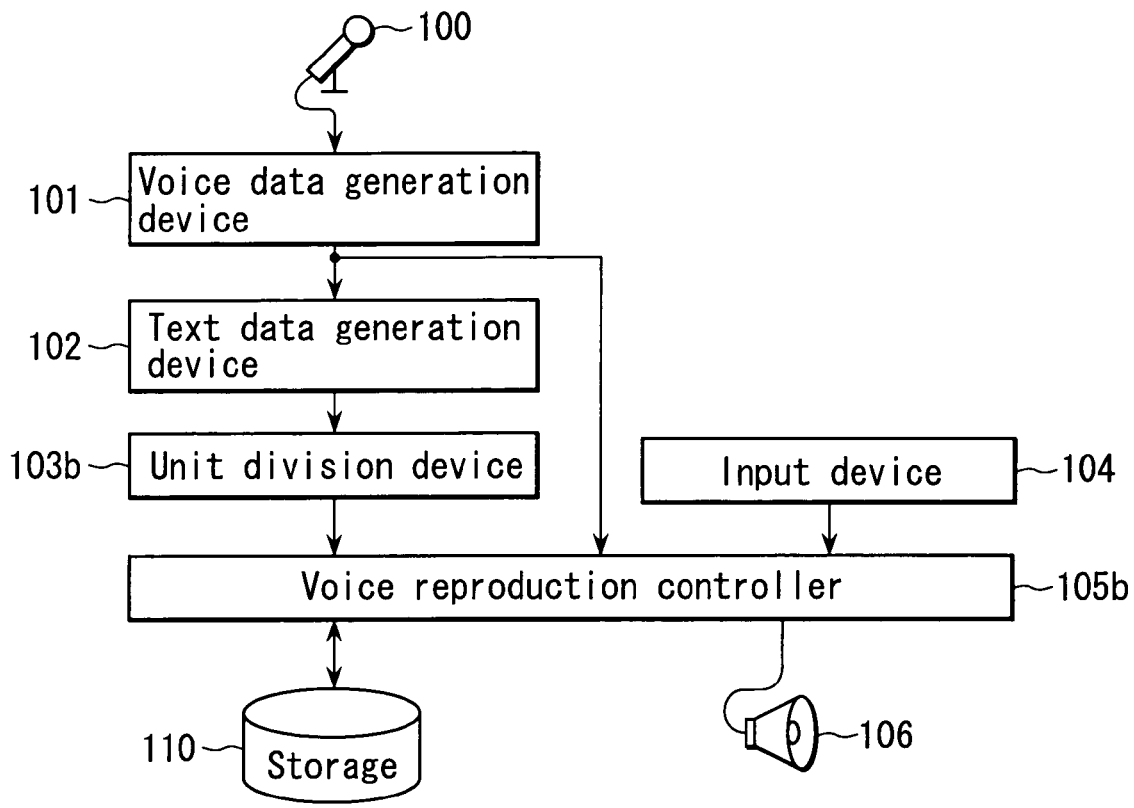
FIG. 8 is a block diagram illustrating the configuration of a variable voice rate apparatus according to a second embodiment of the invention.

An embodiment of the invention will be described in detail with reference to the accompanying drawings.

FIG. 1 illustrates the configuration of a variable voice rate apparatus according to a first embodiment of the invention.

The variable voice rate apparatus of FIG. 1 comprises a microphone 100, voice data generation device 101, text data generation device 102, unit division device 103a, input device 104, voice reproduction controller 105a and speaker 106.

The voice data generation device 101 converts, into voice data, an analog voice signal input through the microphone 100, and outputs the voice data to the text data generation device 102 and voice reproduction controller 105a.

The text data generation device 102 utilizes a voice recognition technique to analyze the voice data input from the voice data generation device 101, thereby converting the voice data into text data.

The unit division device 103a divides the text data, generated by the text data generation device 102, into units each having a linguistic function, sets reproduction information for unit, and supplies the voice reproduction controller 105a with text unit data as discrimination information for discriminating each unit.

The unit having a linguistic function indicates "morpheme", "word", "basic block", "continued basic blocks", "sentence" or "paragraph". The reproduction information indicates a weighting value α corresponding to each type of unit (e.g. each part of speech).

The input device 104 accepts a reproduction magnification N and total reproduction time L input by, for example, an operator or external device as information related to the reproduction rate of voice data. The thus-input information is stored in a memory incorporated in the voice reproduction controller 105a described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

The voice reproduction controller 105a computes a reproduction time $l_i$ for each unit supplied from the unit division device 103a, based on the text unit data input from the unit division device 103a and the reproduction condition input from the input device 104. The reproduction time $l_i$ for each unit is varied in accordance with the text unit data and reproduction condition. After that, the controller 105a converts, into an analog voice signal, the voice data input from the voice data generation device 101, based on the computed reproduction time $l_i$, thereby outputting the analog signal from the speaker 106.

The operation of the variable voice rate apparatus will be described.

The voice generated by a user is converted into an analog voice signal by the microphone 100, and input to the voice data generation device 101, where the voice signal is converted into voice data. The voice data is output to the text data generation device 102 and voice reproduction controller 105a.

The text data generation device 102 analyzes the voice data and converts it into text data. FIG. 2 shows an example of text data, into which the variable voice rate apparatus of FIG. 1 converts a voice signal input by a user. In FIG. 2, "sl" represents the state in which no voice signal exists for a predetermined time or more. "sl" is inserted into text data by the text data generation device 102.

Subsequently, the unit division device 103a divides the text data into units each having a linguistic function. In the description below, the text data is divided into units of "morphemes" (hereinafter referred to simply as "units"). If the text data shown in FIG. 2 is divided into units, it is divided as illustrated in FIG. 3.

In FIG. 3, "/" (slash) indicates the break point of each unit. A numerical value corresponding to each unit indicates the time required for reproducing each unit of input voice data at the standard rate. In the shown example, the total reproduction time $L_0$ of the input voice data is 60 seconds.

After that, the unit division device 103a sets, for each unit, reproduction information corresponding to each type of unit as illustrated in FIG. 4. As a result, text unit data, in which reproduction information is related to each unit, is generated as illustrated in FIG. 5, and output to the voice reproduction controller 105a.

On the other hand, the reproduction magnification N and total reproduction time L are input through the input device 104, and sent to the voice reproduction controller 105a. In this embodiment, assume that the total reproduction time $L_0$ of the input voice data is 60 seconds, the total reproduction time L after the weighting process is set to 40 seconds, and the reproduction magnification N is set to three times.

Upon receiving the text unit data from the unit division device 103a, and the reproduction magnification N and total reproduction time L from the input device 104, the voice reproduction controller 105a computes a reproduction speed ratio for each unit using the received information and following equation (1):

$$\text{(Reproduction speed ratio of } w_i\text{)} = \frac{1}{a_i} \times N \times \frac{L}{L_0} = \frac{1}{a_i} \times N \times \frac{\sum_i (a_i \cdot l_i)}{\sum_i l_i} \quad (1)$$

In the equation (1), "i" represents the order of each unit, "$w_i$" each unit (morpheme), "$l_i$" the reproduction time of each unit, "$a_i$" the weight of each unit determined from corresponding reproduction information, "$L_0$" the original total reproduction time of input voice, "L" the total reproduction time of the input voice after the input data is subjected to weight assignment, and "N" the reproduction magnification.

In this embodiment, the reproduction speed ratio corresponding to each type of morpheme (each part of speech), given by the equation (1), is as shown in FIG. 6.

Referring to the reproduction speed ratio, the voice reproduction controller 105a computes the reproduction time $l_i$ of each unit as shown in FIG. 7, and uses the computed time as reproduction control data. In accordance with the reproduction control data, the controller 105a controls the reproduction of voice data input from the voice data generation device 101, and outputs the reproduced data through the speaker 106.

As described above, in the variable voice rate apparatus of the first embodiment, not all voice data items are reproduced at the same rate, which differs from the prior art. Instead, all voice data items are converted into text data, and this text data is analyzed. After that, the text data is divided into units, such as morphemes, and the reproduction rate (reproduction time) of each unit is controlled so as to obtain a desired reproduction rate (reproduction time) as a whole.

Accordingly, the variable voice rate apparatus of the first embodiment can reproduce, at a low rate, an important unit for understanding the content, and a non-important unit at a high rate. This means that the content of voice data reproduced even at a high rate can be easily understood.

A variable voice rate apparatus according to a second embodiment of the invention will be described. FIG. 8 shows the configuration of this apparatus.

The variable voice rate apparatus of FIG. 8 comprises a microphone 100, voice data generation device 101, text data generation device 102, unit division device 103b, input device 104, voice reproduction controller 105b, speaker 106 and storage 110.

The voice data generation device 101 converts, into voice data, an analog voice signal input through the microphone 100, and outputs the voice data to the text data generation device 102 and voice reproduction controller 105b.

The text data generation device 102 utilizes a voice recognition technique to analyze the voice data input from the voice data generation device 101, thereby converting the voice data into text data.

The unit division device 103b divides the text data, generated by the text data generation device 102, into units each having a linguistic function, sets reproduction information for each unit, and supplies the voice reproduction controller 105b with text unit data as discrimination information for discriminating each unit.

The unit having a linguistic function indicates "morpheme", "word", "basic block", "continued basic blocks", "sentence" or "paragraph". The reproduction information indicates a weighting value α corresponding to each type of unit (e.g. each part of speech).

The input device 104 accepts a reproduction magnification N and total reproduction time L input by, for example, an operator or external device as information related to the reproduction rate of voice data. The thus-input information is stored in a memory incorporated in the voice reproduction controller 105b described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

The voice reproduction controller 105b stores, into the storage 110, the voice data input from the voice data generation device 101 and the text unit data input from the unit division device 103b.

The storage 110 is formed of, for example, a semiconductor memory, hard disk or optical recording medium, to which the voice reproduction controller 105b writes data. It is desirable that the recording medium be attachable to and detachable from the variable voice rate apparatus.

The voice reproduction controller 105b computes a reproduction time $l_i$ for each unit supplied from the unit division device 103b, based on the text unit data and the reproduction condition input from the input device 104, thereby storing, into the storage 110, reproduction time $l_i$ as reproduction control data. The reproduction time $l_i$ for each unit is varied in accordance with the text unit data and reproduction condition.

In response to a request made by a user through the input device 104, the voice reproduction controller 105b converts the voice data stored in the storage 110 into an analog voice signal, so that the voice data is reproduced in the reproduction time $l_i$ indicated by the reproduction control data. The thus-obtained analog signal is output through the speaker 106.

The operation of the variable voice rate apparatus of the second embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105b.

The text data generation device 102 analyzes the voice data and converts it into text data. FIG. 2 shows an example of text data. In FIG. 2, "sl" represents the state in which no voice signal exists for a predetermined time or more. "sl" is inserted into text data by the text data generation device 102.

Subsequently, the unit division device 103b divides the text data into units each having a linguistic function. In the description below, the text data is divided into units of "morphemes" (hereinafter referred to simply as "units"). If the text data shown in FIG. 2 is divided into units, it is divided as illustrated in FIG. 3.

In FIG. 3, "/" (slash) indicates the break point of each unit. A numerical value corresponding to each unit indicates the time required for reproducing each unit of input voice data at the standard rate. In the shown example, the total reproduction time $L_0$ of the input voice data is 60 seconds.

After that, the unit division device 103b sets, for each unit, reproduction information corresponding to each type of unit as illustrated in FIG. 4. As a result, text unit data, in which reproduction information is related to each unit, is generated as illustrated in FIG. 5, and output to the voice reproduction controller 105b.

On the other hand, the reproduction magnification N and total reproduction time L are input through the input device 104, and sent to the voice reproduction controller 105b. In this embodiment, assume that the total reproduction time $L_0$ of the input voice data is 60 seconds, the total reproduction time L after the weighting process is set to 40 seconds, and the reproduction magnification N is set to three times.

Upon receiving the text unit data from the unit division device 103b, and the reproduction magnification N and total reproduction time L from the input device 104, the voice reproduction controller 105b computes a reproduction speed ratio for each unit using the received information and the equation (1) mentioned in the first embodiment.

Furthermore, the voice reproduction controller 105b computes a reproduction time $l_i$ for each unit as shown in FIG. 7, and stores the time $l_i$ as reproduction control data into the storage 110.

After that, in response to a request made by a user through the input device 104, the voice reproduction controller 105b converts the voice data stored in the storage 110 into an analog voice signal, so that the voice data is reproduced in the reproduction time $l_i$ indicated by the reproduction control data. The thus-obtained analog signal is output through the speaker 106.

As described above, in the variable voice rate apparatus of the second embodiment, not all voice data items are reproduced at the same rate, which differs from the prior art. Instead, all voice data items are converted into text data, and this text data is analyzed. After that, the text data is divided into units, such as morphemes, and the reproduction rate (reproduction time) of each unit is controlled so as to obtain a desired reproduction rate (reproduction time) as a whole.

Accordingly, the variable voice rate apparatus of the second embodiment can reproduce, at a low rate, an important unit for understanding the content, and a non-important unit at a high rate. This means that the content of voice data reproduced even at a high rate can be easily understood.

Further, in the variable voice rate apparatus of the second embodiment, a reproduction time $l_i$ for each unit is computed, and stored in the storage 110 together with the voice data input from the voice data generation device 101. In response to a request made by a user, each unit of the voice data is reproduced in the reproduction time $l_i$ corresponding thereto.

As described above, in the variable voice rate apparatus of the second embodiment, voice data and a reproduction time $l_i$ corresponding to each unit of the voice data are related to each other before reproduction of the voice data. Therefore, quick reproduction can be performed in accordance with a request by a user.

The recording medium included in the storage 110 can record the above-described information that enables voice data to be reproduced at high speed without reducing the level of aural comprehension thereof. If another reproduction apparatus incorporates this recording medium, it can also realize high-speed reproduction.

Figure 9:
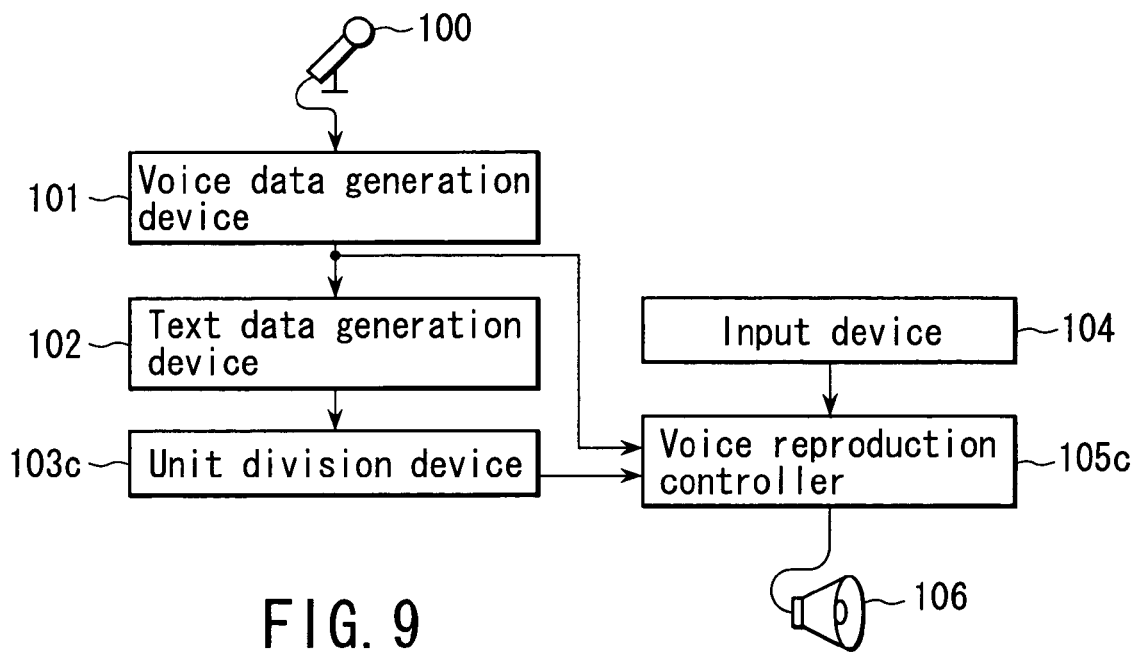
FIG. 9 is a block diagram illustrating the configuration of a variable voice rate apparatus according to a third embodiment of the invention.

A variable voice rate apparatus according to a third embodiment of the invention will be described. FIG. 9 shows the configuration of this apparatus.

The variable voice rate apparatus of FIG. 9 comprises a microphone 100, voice data generation device 101, text data generation device 102, unit division device 103c, input device 104, voice reproduction controller 105c and speaker 106.

The voice data generation device 101 converts, into voice data, an analog voice signal input through the microphone 100, and outputs the voice data to the text data generation device 102 and voice reproduction controller 105c.

The text data generation device 102 utilizes a voice recognition technique to analyze the voice data input from the voice data generation device 101, thereby converting the voice data into text data.

The unit division device 103c divides the text data, generated by the text data generation device 102, into units each having a linguistic function, sets reproduction information for each unit, and supplies the voice reproduction controller 105c with text unit data as discrimination information for discriminating each unit.

The unit having a linguistic function indicates, for example, "morpheme", "word", "basic block", "continued basic blocks", "sentence" or "paragraph".

The input device 104 accepts a reproduction magnification N and total reproduction time L input by, for example, an operator or external device as information related to the reproduction rate of voice data. The thus-input information is stored in a memory incorporated in the voice reproduction controller 105c described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

Based on the text unit data generated by the unit division device 103c and the reproduction magnification N input through the input device 104, the voice reproduction controller 105c converts voice data into an analog voice signal, selectively using the units obtained by the unit division device 103c, and outputs the signal through the speaker 106.

The operation of the variable voice rate apparatus of the third embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105c.

The text data generation device 102 analyzes the voice data and converts it into text data. FIG. 10 shows an example of text data into which voice from a user is converted.

Subsequently, the unit division device 103c divides the text data into units each having a linguistic function, and supplies the voice reproduction controller 105c with text unit data as discrimination information for discriminating each unit. In the description below, the voice data is divided into "basic blocks".

When the text data shown in FIG. 10 is divided into units of "basic blocks" (hereinafter referred to simply as "units"), it is divided as illustrated in FIG. 11. In FIG. 11, "/" indicates the break point of each unit (basic block).

On the other hand, the reproduction magnification N is input through the input device 104, and sent to the voice reproduction controller 105c. In this embodiment, the reproduction magnification N is set to two times.

Upon receiving the text unit data from the unit division device 103c and the reproduction magnification N (N=2) from the input device 104, the voice reproduction controller 105c generates reproduction control data indicative of every other unit as shown in FIG. 12. Based on this reproduction control data, the controller 105c converts every other unit of voice data into an analog voice signal and outputs the signal through the speaker 106.

If the reproduction magnification N is set to three times, the voice reproduction controller 105c reproduces every third unit of voice data. Similarly, if the reproduction magnification N is set to a number M of times, the voice reproduction controller 105c reproduces every M-th unit of voice data.

As described above, in the variable voice rate apparatus of the third embodiment, not all voice data items are reproduced at the same rate, which differs from the prior art. Instead, all voice data items are converted into text data, and this text data is analyzed. After that, in accordance with a designated reproduction rate, the units (e.g., basic blocks) of the text data are selectively reproduced.

Thus, the variable voice rate apparatus of the third embodiment reproduces selected units of voice data at the standard rate. This enables the voice data to be reproduced sufficiently understandably, with the time required for its reproduction shortened.

Figure 13:
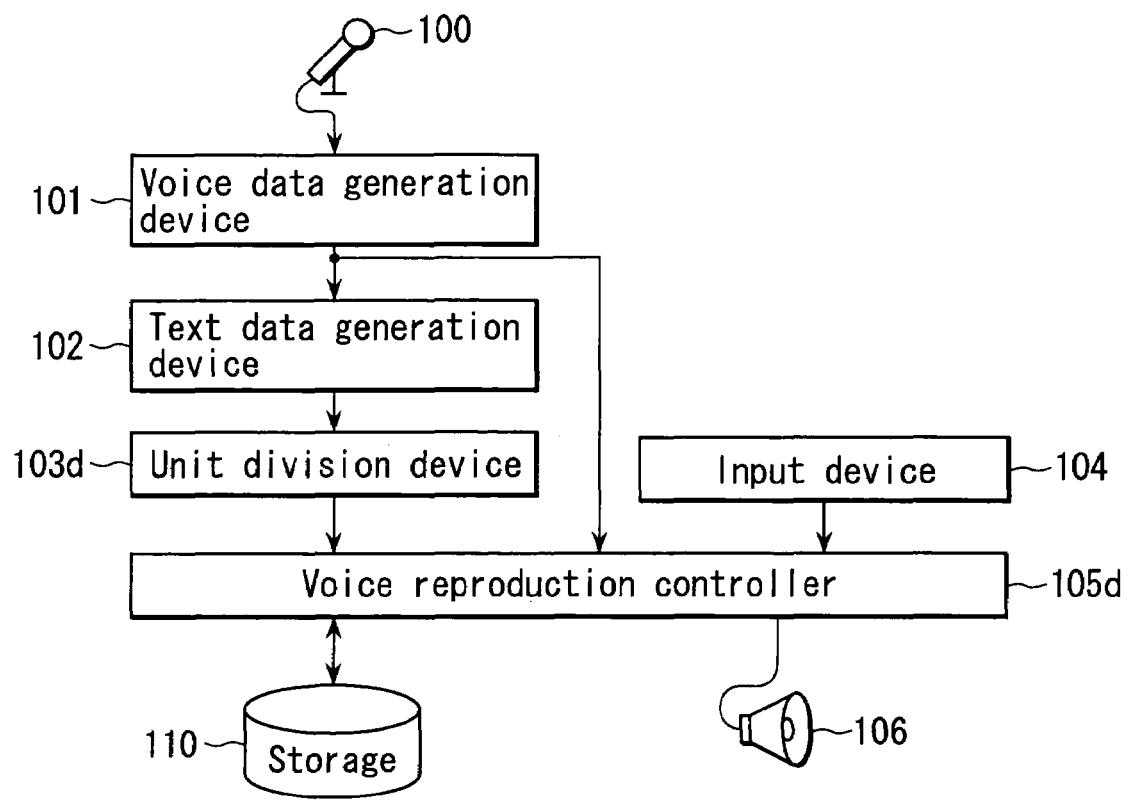
FIG. 13 is a block diagram illustrating the configuration of a variable voice rate apparatus according to a fourth embodiment of the invention.

A variable voice rate apparatus according to a fourth embodiment of the invention will be described. FIG. 13 shows the configuration of this apparatus.

The variable voice rate apparatus of FIG. 13 comprises a microphone 100, voice data generation device 101, text data generation device 102, unit division device 103d, input device 104, voice reproduction controller 105d, speaker 106 and storage 110.

The voice data generation device 101 converts, into voice data, an analog voice signal input through the microphone 100, and outputs the voice data to the text data generation device 102 and voice reproduction controller 105d.

The text data generation device 102 utilizes a voice recognition technique to analyze the voice data input from the voice data generation device 101, thereby converting the voice data into text data.

The unit division device 103d divides the text data, generated by the text data generation device 102, into units each having a linguistic function, sets reproduction information for each unit, and supplies the voice reproduction controller 105d with text unit data as discrimination information for discriminating each unit.

The unit having a linguistic function indicates "morpheme", "word", "basic block", "continued basic blocks", "sentence" or "paragraph".

The input device 104 accepts a reproduction magnification N input by, for example, an operator or external device as information related to the reproduction rate of voice data. The thus-input information is stored in a memory incorporated in the voice reproduction controller 105d described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

The voice reproduction controller 105d stores, into the storage 110, the voice data input from the voice data generation device 101 and the text unit data input from the unit division device 103d.

The storage 110 is formed of, for example, a semiconductor memory, hard disk or optical recording medium, to which the voice reproduction controller 105d writes data. It is desirable that the recording medium be attachable to and detachable from the variable voice rate apparatus.

Based on the text unit data and the reproduction magnification N input through the input device 104, the voice reproduction controller 105d selects units from those generated by the unit division device 103d, and stores, into the storage 110, reproduction control data indicating the selected units.

Thereafter, in response to a request from a user via the input device 104, the voice reproduction controller 105d converts, into an analog voice signal, the units contained in the voice data stored in the storage 110, which are indicated by the reproduction control data, and outputs the signal through the speaker 106.

The operation of the variable voice rate apparatus of the fourth embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105d.

The text data generation device 102 analyzes the voice data and converts it into text data. FIG. 10 shows an example of text data into which voice from a user is converted.

Subsequently, the unit division device 103d divides the text data into units each having a linguistic function, and supplies the voice reproduction controller 105d with text unit data as discrimination information for discriminating each unit.

The voice data and text unit data are stored into the storage 110 by the voice reproduction controller 105d. In the description below, the voice data is divided into "basic blocks".

When the text data shown in FIG. 10 is divided into units of "basic blocks" (hereinafter referred to simply as "units"), it is divided as illustrated in FIG. 11. In FIG. 11, "/" (slash) indicates the break point of each unit (basic block).

On the other hand, the reproduction magnification N is input through the input device 104, and sent to the voice reproduction controller 105*d*. In this embodiment, the reproduction magnification N is set to two times.

Upon receiving the text unit data from the unit division device 103*d* and the reproduction magnification N (N=2) from the input device 104, the voice reproduction controller 105*d* generates reproduction control data indicative of every other unit as shown in FIG. 12, and stores it into the storage 110.

After that, in response to a request from a user via the input device 104, the voice reproduction controller 105*d* converts, into an analog voice signal, the units contained in the voice data stored in the storage 110, which are indicated by the reproduction control data, and outputs the signal through the speaker 106.

As described above, in the variable voice rate apparatus of the fourth embodiment, not all voice data items are reproduced at the same rate, which differs from the prior art. Instead, all voice data items are converted into text data, and this text data is analyzed. After that, in accordance with a designated reproduction rate, the units (e.g., basic blocks) of the text data are selectively reproduced.

Thus, the variable voice rate apparatus of the fourth embodiment reproduces selected units of voice data at the standard rate. This enables the voice data to be reproduced sufficiently understandably, with the time required for its reproduction shortened.

Further, in the variable voice rate apparatus of the fourth embodiment, unit discrimination information indicative of to-be-reproduced units is stored in the storage 110 together with voice data in corresponding to the reproduction magnification N designated by a user. In response to a request made by a user, voice data corresponding to the unit discrimination information is reproduced.

As described above, in the variable voice rate apparatus of the fourth embodiment, unit discrimination information indicative of to-be-reproduced units is generated and stored together with voice data, before reproduction. Therefore, prompt reproduction of voice data can be performed in response to a request from a user.

Further, the recording medium included in the storage 110 can record the above-described information that enables voice data to be reproduced at high speed without reducing the level of aural comprehension thereof. If another reproduction apparatus incorporates this recording medium, it can also realize high-speed reproduction.

Figure 14:
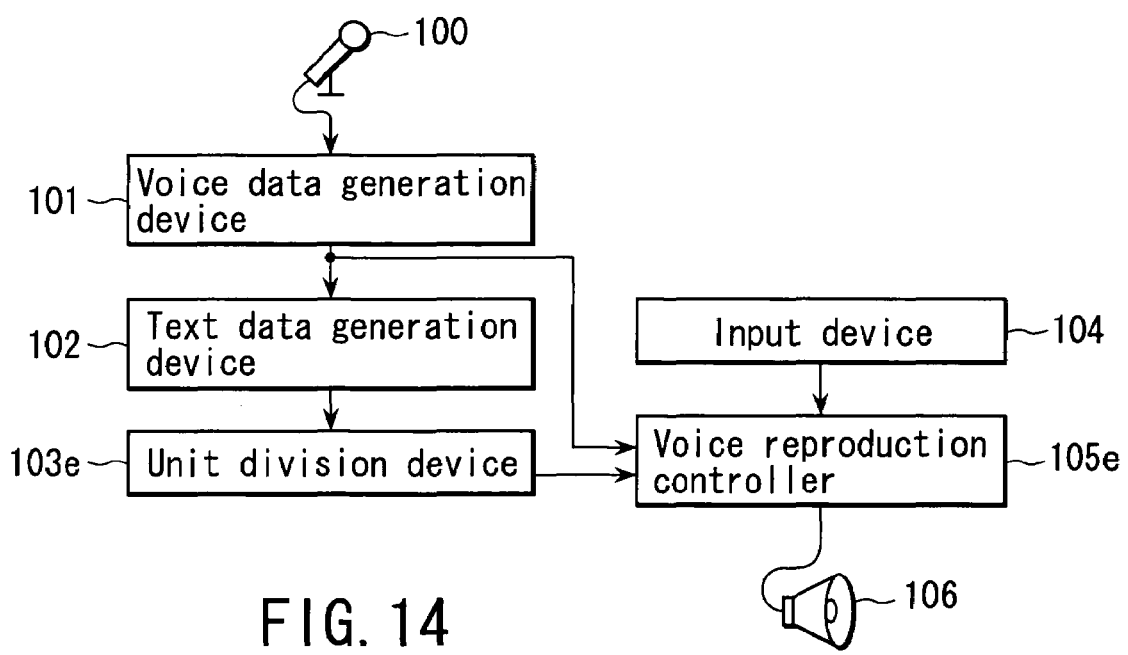
FIG. 14 is a block diagram illustrating the configuration of a variable voice rate apparatus according to a fifth embodiment of the invention.

A variable voice rate apparatus according to a fifth embodiment of the invention will be described. FIG. 14 shows the configuration of this apparatus.

The variable voice rate apparatus of FIG. 14 comprises a microphone 100, voice data generation device 101, text data generation device 102, unit division device 103*e*, input device 104, voice reproduction controller 105*e* and speaker 106.

The voice data generation device 101 converts, into voice data, an analog voice signal input through the microphone 100, and outputs the voice data to the text data generation device 102 and voice reproduction controller 105*e*.

The text data generation device 102 utilizes a voice recognition technique to analyze the voice data input from the voice data generation device 101, thereby converting the voice data into text data.

The unit division device 103*e* divides the text data, generated by the text data generation device 102, into units each having a linguistic function, sets reproduction information for each unit, and supplies the voice reproduction controller 105*e* with text unit data as discrimination information for discriminating each unit.

The unit having a linguistic function indicates, for example, "morpheme", "word", "basic block", "continued basic blocks", "sentence" or "paragraph".

The input device 104 accepts keywords and extraction threshold value input by, for example, an operator or external device as information related to the reproduction rate of voice data. The thus-input information is stored in a memory incorporated in the voice reproduction controller 105*e* described later.

Based on the text unit data generated by the unit division device 103*e* and the keywords and extraction threshold value input through the input device 104, the voice reproduction controller 105*e* converts voice data into an analog voice signal, selectively using the units obtained by the unit division device 103*e*, and outputs the signal through the speaker 106.

The operation of the variable voice rate apparatus of the fifth embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105*e*.

The text data generation device 102 analyzes the voice data and converts it into text data. FIG. 15 shows an example of text data, into which a voice signal input by a user is converted.

Subsequently, the unit division device 103*e* divides the text data into units each having a linguistic function, and supplies the voice reproduction controller 105*e* with text unit data as discrimination information for discriminating each unit. In the description below, the text data is divided into "sentences".

On the other hand, the keywords and extraction threshold value are input through the input device 104, and sent to the voice reproduction controller 105*e*. In this embodiment, three words "reproduction", "time" and "control" are input as the keywords, and "2" is input as the extraction threshold value.

Figures 16, 17:
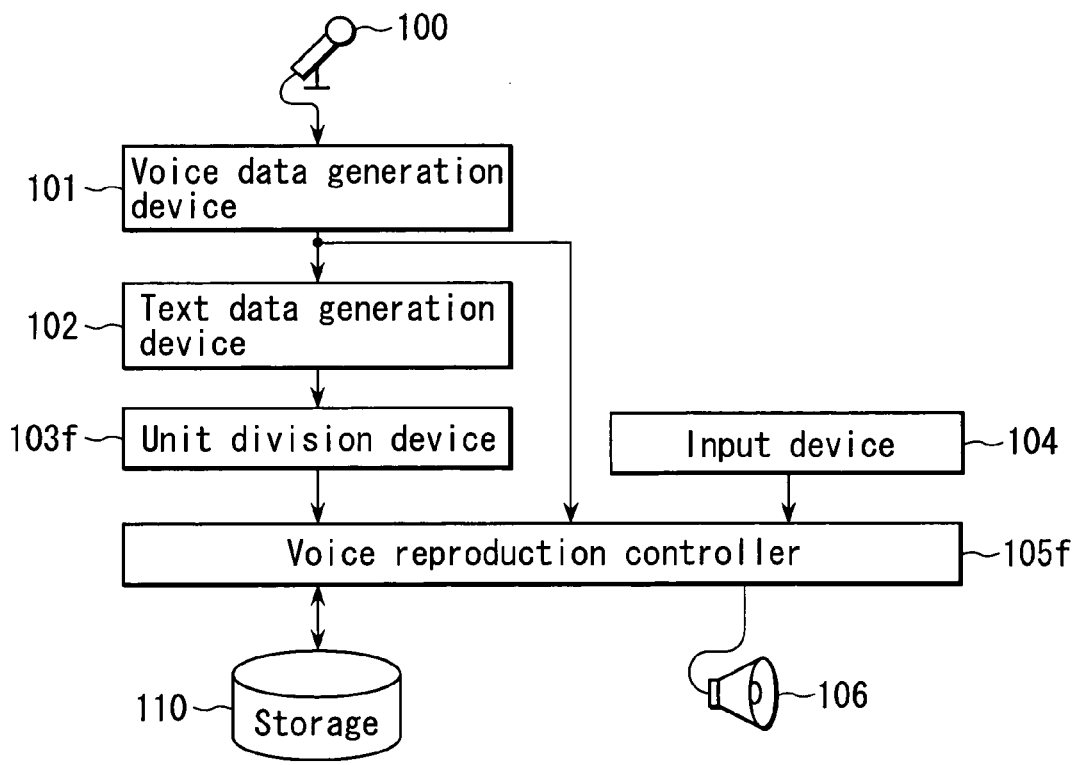
FIG. 16 shows examples of units selected by the variable voice rate apparatus of FIG. 14 to reproduce them.
FIG. 17 is a block diagram illustrating the configuration of a variable voice rate apparatus according to a sixth embodiment of the invention.

Upon receiving the text unit data from the unit division device 103*e*, and the three keywords and extraction threshold value from the input device 104, the voice reproduction controller 105*e* detects, using the text unit data, whether each sentence contains the keywords, as is illustrated in FIG. 15. Thus, all sentences that each contains two or more keywords are detected as illustrated in FIG. 16.

After that, the voice reproduction controller 105*e* generates reproduction control data as the identification information of the detected sentences, thereby converting, into an analog voice signal, voice data corresponding to each detected sentence, based on the reproduction control data, and outputting the signal through the speaker 106.

As described above, in the variable voice rate apparatus of the fifth embodiment, not all voice data items are reproduced at the same rate, which differs from the prior art. Instead, all voice data items are converted into text data, and this text data is analyzed. After that, all units that each contains a designated number (=extraction threshold value) of designated keywords are extracted, and only the extracted units are reproduced at the standard rate.

Thus, the variable voice rate apparatus of the fifth embodiment reproduces only the units needed by a user at the standard rate. This enables the voice data to be reproduced sufficiently understandably, with the time required for its reproduction shortened.

A variable voice rate apparatus according to a sixth embodiment of the invention will be described. FIG. 17 shows the configuration of this apparatus.

The variable voice rate apparatus of FIG. 17 comprises a microphone 100, voice data generation device 101, text data generation device 102, unit division device 103f, input device 104, voice reproduction controller 105f, speaker 106 and storage 110.

The voice data generation device 101 converts, into voice data, an analog voice signal input through the microphone 100, and outputs the voice data to the text data generation device 102 and voice reproduction controller 105f.

The text data generation device 102 utilizes a voice recognition technique to analyze the voice data input from the voice data generation device 101, thereby converting the voice data into text data.

The unit division device 103f divides the text data, generated by the text data generation device 102, into units each having a linguistic function, sets reproduction information for each unit, and supplies the voice reproduction controller 105f with text unit data as discrimination information for discriminating each unit.

The unit having a linguistic function indicates "morpheme", "word", "basic block", "continued basic blocks", "sentence" or "paragraph".

The input device 104 accepts keywords and extraction threshold value input by, for example, an operator or external device as information related to the reproduction rate of voice data. The thus-input information is stored in a memory incorporated in the voice reproduction controller 105f described later.

The voice reproduction controller 105f stores, into the storage 110, the voice data input from the voice data generation device 101 and the text unit data input from the unit division device 103f.

The storage 110 is formed of, for example, a semiconductor memory, hard disk or optical recording medium, to which the voice reproduction controller 105f writes data. It is desirable that the recording medium be attachable to and detachable from the variable voice rate apparatus.

Based on the text unit data, and the keywords and extraction threshold value input through the input device 104, the voice reproduction controller 105f selects units from those generated by the unit division device 103f, and stores, into the storage 110, reproduction control data indicating the selected units.

Thereafter, in response to a request from a user via the input device 104, the voice reproduction controller 105f converts, into an analog voice signal, the units contained in the voice data stored in the storage 110, which are indicated by the reproduction control data, and outputs the signal through the speaker 106.

The operation of the variable voice rate apparatus of the sixth embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105f.

The text data generation device 102 analyzes the voice data and converts it into text data. FIG. 15 shows an example of text data, into which a voice signal input by a user is converted.

Subsequently, the unit division device 103f divides the text data into units each having a linguistic function, and supplies the voice reproduction controller 105f with text unit data as discrimination information for discriminating each unit.

The reproduction controller 105f stores the voice data and text unit data into the storage 110. In the description below, the text data is divided into "sentences".

On the other hand, the keywords and extraction threshold value are input through the input device 104, and sent to the voice reproduction controller 105f. In this embodiment, three words "reproduction", "time" and "control" are input as the keywords, and "2" is input as the extraction threshold value.

Upon receiving the text unit data from the unit division device 103f, and the three keywords and extraction threshold value from the input device 104, the voice reproduction controller 105f detects, using the text unit data, whether each sentence contains the keywords, as is illustrated in FIG. 15. Thus, all sentences that each contains two or more keywords are detected as illustrated in FIG. 16, and are stored as reproduction control data into the storage 110.

After that, the voice reproduction controller 105f converts, into an analog signal, the sentences contained in the voice data stored in the storage 110, which are indicated by the reproduction control data, thereby outputting the signal through the speaker 106.

As described above, in the variable voice rate apparatus of the sixth embodiment, not all voice data items are reproduced at the same rate, which differs from the prior art. Instead, all voice data items are converted into text data, and this text data is analyzed. After that, all units that each contains a designated number (=extraction threshold value) of designated keywords are extracted, and only the extracted units are reproduced at the standard rate.

Thus, the variable voice rate apparatus of the sixth embodiment reproduces only the units needed by a user at the standard rate. This enables the voice data to be reproduced sufficiently understandably, with the time required for its reproduction shortened.

Further, in the variable voice rate apparatus of the sixth embodiment, unit discrimination information indicative of to-be-reproduced units is stored in the storage 110 together with voice data. In response to a request made by a user, voice data corresponding to the unit discrimination information is reproduced.

As described above, in the variable voice rate apparatus of the sixth embodiment, unit discrimination information indicative of to-be-reproduced units is generated and stored together with voice data, before reproduction. Therefore, prompt reproduction of voice data can be performed in response to a request from a user.

Further, the recording medium included in the storage 110 can record the above-described information that enables voice data to be reproduced at high speed without reducing the level of aural comprehension thereof. If another reproduction apparatus incorporates this recording medium, it can also realize high-speed reproduction.

A variable voice rate apparatus according to a seventh embodiment of the invention will be described. FIG. 18 shows the configuration of this apparatus.

The variable voice rate apparatus of FIG. 18 comprises a microphone 100, voice data generation device 101, text data generation device 102, unit division device 103g, input device 104, voice reproduction controller 105g, speaker 106 and storage 120.

The voice data generation device 101 converts, into voice data, an analog voice signal input through the microphone 100, and outputs the voice data to the text data generation device 102 and voice reproduction controller 105g.

The text data generation device 102 utilizes a voice recognition technique to analyze the voice data input from the voice data generation device 101, thereby converting the voice data into text data.

The unit division device 103g divides the text data, generated by the text data generation device 102, into units each having a linguistic function, sets reproduction information for each unit, and supplies the voice reproduction controller 105g with text unit data as discrimination information for discriminating each unit.

The unit having a linguistic function indicates "morpheme", "word", "basic block", "continued basic blocks", "sentence" or "paragraph".

The input device 104 accepts a reproduction magnification N and total reproduction time L input by, for example, an operator or external device as information related to the reproduction rate of voice data. The thus-input information is stored in a memory incorporated in the voice reproduction controller 105g described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

Based on the text unit data generated by the unit division device 103g, the reproduction magnification N input through the input device 104, and linguistic priority information stored in the storage 120 described later, the voice reproduction controller 105g converts voice data into an analog voice signal, selectively using the units obtained by the unit division device 103g. The resultant signal is output through the speaker 106.

The storage 120 stores, as the linguistic priority information (e.g. information shown in FIG. 19), information concerning a number of conjunctions classified in accordance with the level of priority.

The operation of the variable voice rate apparatus of the seventh embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105g.

The text data generation device 102 analyzes the voice data and converts it into text data.

Subsequently, the unit division device 103g divides the text data into units each having a linguistic function, and supplies the voice reproduction controller 105g with text unit data as discrimination information for discriminating each unit. In the description below, the voice data is divided into "sentences".

FIG. 20 illustrates examples of text data, into which the voice generated by a user is converted. This figure shows only conjunctions placed at the top of each sentence (1) to (8).

A reproduction magnification N is input through the input device 104, and sent to the voice reproduction controller 105g. In this embodiment, the reproduction magnification N is set to two times.

Upon receiving the text unit data from the unit division device 103g, and the reproduction magnification N from the input device 104, the voice reproduction controller 105g detects the reproduction time required for reproducing each sentence (1) to (8) at the standard rate, and the total reproduction time required for reproducing all the sentences at the standard rate. Assume here that the detected total reproduction time is 80 seconds.

Based on the reproduction magnification N (=2) and detected total reproduction time (=80 seconds), the voice reproduction controller 105g determines that the time required for reproducing the sentences at the reproduction magnification N is within 40 seconds.

After that, referring to the linguistic priority information stored in the storage 120, the voice reproduction controller 105g determines the order of the sentences (1) to (8) of the text unit data, beginning from the sentence that begins with the most important conjunction. Subsequently, the controller 105g selects, from the sentences of higher priority levels, the sentences whose total reproduction time is closest to the requested reproduction time of 40 seconds and within 40 seconds.

The voice reproduction controller 105g generates, as reproduction control data, identification information indicating the selected sentences. From the examples in FIG. 20, the sentences (1), (3), (6) and (8), whose total reproduction time is 40 seconds, are selected as illustrated in FIG. 21.

After that, based on the reproduction control data, the voice reproduction controller 105g converts, into an analog voice signal, voice data corresponding to each of the selected sentences (1), (3), (6) and (8), and outputs the signal through the speaker 106.

As described above, in the variable voice rate apparatus of the seventh embodiment, not all voice data items are reproduced at the same rate, which differs from the prior art. Instead, all voice data items are converted into text data, and this text data is analyzed. After that, units each containing a character string of high priority are extracted, and only the extracted units are reproduced at the standard rate.

Accordingly, the variable voice rate apparatus of the seventh embodiment reproduces, by priority at the standard rate, the units of voice data that contain character strings of higher priority. This enables the voice data to be reproduced sufficiently understandably, with the time required for its reproduction shortened.

Further, units of higher priority are selected from voice data so that the voice data can be reproduced within the reproduction time corresponding to the reproduction magnification N designated by a user. Thus, the voice data can be reproduced within the time designated by the user.

The invention is not limited to the above-described seventh embodiment.

In the seventh embodiment, conjunctions, for example, are stored as linguistic priority information in the storage 120, and the order of priority of sentences is determined from the order of priority of the conjunctions.

However, the invention is not limited to this. Instead, the number of words or characters, or the number or ratio of independent words, such as noun and verb, in each unit may be detected to determine the order of priority of units.

Furthermore, although in the seventh embodiment, the reproduction time is determined in accordance with the reproduction magnification N designated by a user, the number of units (sentences) to be reproduced may be too small if the reproduction magnification N is set to a high value.

In light of this, the process may be modified such that if the number of reproduced units is less than a predetermined threshold value, the voice reproduction controller 105g reduces the reproduction magnification N to increase the number of to-be-reproduced units.

A variable voice rate apparatus according to an eighth embodiment of the invention will be described. FIG. 22 shows the configuration of this apparatus.

The variable voice rate apparatus of FIG. 22 comprises a microphone 100, voice data generation device 101, text data generation device 102, unit division device 103h, input device 104, voice reproduction controller 105h, speaker 106 and storages 110 and 120.

The voice data generation device 101 converts, into voice data, an analog voice signal input through the microphone 100, and outputs the voice data to the text data generation device 102 and voice reproduction controller 105h.

The text data generation device 102 utilizes a voice recognition technique to analyze the voice data input from the voice data generation device 101, thereby converting the voice data into text data.

The unit division device 103h divides the text data, generated by the text data generation device 102, into units each having a linguistic function, sets reproduction information for each unit, and supplies the voice reproduction controller 105h with text unit data as discrimination information for discriminating each unit.

The unit having a linguistic function indicates "morpheme", "word", "basic block", "continued basic blocks", "sentence" or "paragraph".

The input device 104 accepts a reproduction magnification N and total reproduction time L input by, for example, an operator or external device as information related to the reproduction rate of voice data. The thus-input information is stored in a memory incorporated in the voice reproduction controller 105h described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

The voice reproduction controller 105h stores, into the storage 110, the voice data input from the voice data generation device 101 and the text unit data input from the unit division device 103h.

The storage 110 is formed of, for example, a semiconductor memory, hard disk or optical recording medium, to which the voice reproduction controller 105h writes data. It is desirable that the recording medium be attachable to and detachable from the variable voice rate apparatus.

Based on the text unit data, the reproduction magnification N input through the input device 104, and linguistic priority information stored in the storage 120 described later, the voice reproduction controller 105h selects to-be-reproduced units, and stores, into the storage 110, the selected units as reproduction control data.

In response to a request made by a user through the input device 104, the voice reproduction controller 105h converts, into an analog voice signal, the portion of the voice data stored in the storage 110, which is indicated by the reproduction control data. The thus-obtained analog signal is output through the speaker 106.

The storage 120 stores, as linguistic priority information, the information concerning a number of conjunctions classified in accordance with the level of priority, as shown in, for example, FIG. 19.

The operation of the variable voice rate apparatus of the eighth embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105h.

The text data generation device 102 analyzes the voice data and converts it into text data.

Subsequently, the unit division device 103h divides the text data into units each having a linguistic function, and supplies the voice reproduction controller 105h with text unit data as discrimination information for discriminating each unit.

The voice reproduction controller 105h stores the voice data and text unit data into the storage 110. A description will now be given of the case where voice data is divided into "sentences".

FIG. 20 illustrates examples of text data, into which the voice generated by a user is converted. This figure shows only conjunctions placed at the top of each sentence (1) to (8).

A reproduction magnification N is input through the input device 104, and sent to the voice reproduction controller 105h. In this embodiment, the reproduction magnification N is set to two times.

Upon receiving the text unit data from the unit division device 103h, and the reproduction magnification N from the input device 104, the voice reproduction controller 105h detects the reproduction time required for reproducing each sentence (1) to (8) at the standard rate, and the total reproduction time required for reproducing all the sentences at the standard rate. Assume here that the detected total reproduction time is 80 seconds.

Based on the reproduction magnification N (=2) and detected total reproduction time (=80 seconds), the voice reproduction controller 105h determines that the requested reproduction time is within 40 seconds.

After that, referring to the linguistic priority information stored in the storage 120, the voice reproduction controller 105h determines the order of the sentences (1) to (8) of the text unit data, beginning from the sentence that begins with the most important conjunction. Subsequently, the controller 105h selects, from the sentences of higher priority levels, the sentences whose total reproduction time is closest to the requested reproduction time of 40 seconds and within 40 seconds.

From the examples in FIG. 20, the sentences (1), (3), (6) and (8), whose total reproduction time is 40 seconds, are selected as illustrated in FIG. 21. The voice reproduction controller 105h stores identification information, which indicates the selected sentences, as reproduction control data into the storage 110.

After that, in response to a request from a user via the input device 104, based on the reproduction control data, the voice reproduction controller 105h converts, into an analog voice signal, the portion of the voice data stored in the storage 110, which corresponds to each of the selected sentences (1), (3), (6) and (8). The thus-obtained signal is output through the speaker 106.

As described above, in the variable voice rate apparatus of the eighth embodiment, not all voice data items are reproduced at the same rate, which differs from the prior art. Instead, all voice data items are converted into text data, and this text data is analyzed. After that, units each containing a character string of high priority are extracted, and only the extracted units are reproduced at the standard rate.

Accordingly, the variable voice rate apparatus of the eighth embodiment reproduces, by priority at the standard rate, the units of voice data that contain character strings of higher priority. This enables the voice data to be reproduced sufficiently understandably, with the time required for its reproduction shortened.

Further, units of higher priority are selected from voice data so that the voice data can be reproduced within the reproduction time corresponding to the reproduction magnification N designated by a user. Thus, the voice data can be reproduced within the time designated by the user.

Further, in the variable voice rate apparatus of the eighth embodiment, unit discrimination information indicative of to-be-reproduced units is stored in the storage 110 together with voice data. In response to a request made by a user, voice data corresponding to the unit discrimination information is reproduced.

As described above, in the variable voice rate apparatus of the eighth embodiment, unit discrimination information indicative of to-be-reproduced units is generated and stored together with voice data, before reproduction. Therefore, prompt reproduction of voice data can be performed in response to a request from a user.

Further, the recording medium included in the storage 110 can record the above-described information that enables voice data to be reproduced at high speed without reducing the level of aural comprehension thereof. If another reproduction apparatus incorporates this recording medium, it can also realize high-speed reproduction.

A variable voice rate apparatus according to a ninth embodiment of the invention will be described. FIG. 23 shows the configuration of this apparatus.

The variable voice rate apparatus of FIG. 23 comprises a microphone 100, voice data generation device 101, text data generation device 102, unit division device 103$i$, input device 104, voice reproduction controller 105$i$, speaker 106 and storage 120.

The voice data generation device 101 converts, into voice data, an analog voice signal input through the microphone 100, and outputs the voice data to the text data generation device 102 and voice reproduction controller 105$i$.

The text data generation device 102 utilizes a voice recognition technique to analyze the voice data input from the voice data generation device 101, thereby converting the voice data into text data.

The unit division device 103$i$ divides the text data, generated by the text data generation device 102, into units each having a linguistic function, sets reproduction information for each unit, and supplies the voice reproduction controller 105$i$ with text unit data as discrimination information for discriminating each unit.

The unit having a linguistic function indicates "morpheme", "word", "basic block", "continued basic blocks", "sentence" or "paragraph".

The input device 104 accepts a reproduction magnification N and total reproduction time L input by, for example, an operator or external device as information related to the reproduction rate of voice data. The thus-input information is stored in a memory incorporated in the voice reproduction controller 105$i$ described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

Based on the text unit data generated by the unit division device 103$i$, the reproduction magnification N input through the input device 104, and statistical priority information stored in the storage 120 described later, the voice reproduction controller 105$i$ determines the reproduction rate of each unit of the voice data obtained by the unit division device 103$i$. Based on the determination result (reproduction control data), the voice data is converted into an analog voice signal and output through the speaker 106.

The storage 120 stores the above-mentioned statistical priority information. The statistical priority information indicates the probability of connection of units, which is obtained in advance from a large number of types of printed words.

Common expressions that are often used by people have high probabilities, while uncommon expressions that are not so often used have low probabilities. It is considered that an expression of a high probability, which is often used, can be easily guessed from the reproduced sound or context, even if the expression is not accurately reproduced. In contrast, it is considered that an expression of a low probability, which is not so often used, is hard to guess from the context since the expression is unique.

The operation of the variable voice rate apparatus of the eighth embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105$i$.

The text data generation device 102 analyzes the voice data and converts it into text data. FIG. 24 illustrates an example of text data, into which the voice generated by a user is converted.

Subsequently, the unit division device 103$i$ divides the text data into units each having a linguistic function, and supplies the voice reproduction controller 105$i$ with text unit data as discrimination information for discriminating each unit. In the description below, the voice data is divided into "basic blocks".

On the other hand, the reproduction magnification N is input through the input device 104, and sent to the voice reproduction controller 105$i$. In this embodiment, the reproduction magnification N is set to two times.

Upon receiving the reproduction magnification N from the input device 104, the voice reproduction controller 105$i$ detects the reproduction time required for reproducing each basic block at the standard rate, based on the voice data and text unit data. Assume here that the total reproduction time for reproducing all the units at the standard rate is 52 seconds.

Subsequently, the voice reproduction controller 105$i$ computes a reproduction time based on a request from a user. In this embodiment, since the reproduction magnification N is 2 and the detected total reproduction time is 52 seconds, the voice reproduction controller 105$i$ determines that the requested reproduction time is within 26 seconds.

Further, based on the text unit data, the voice reproduction controller 105$i$ classifies the text data, as shown in FIG. 24, into combinations (1) to (26) of two continuous units as shown in FIG. 25. After that, the controller 105$i$ determines the probability of each of the combinations (1) to (26), referring to the statistic priority information stored in the storage 120.

Concerning those of the combinations (1) to (26) that have a probability not higher than a predetermined threshold value, the voice reproduction controller 105*i* reproduces them at a low rate (standard rate). On the other hand, concerning those of the combinations (1) to (26) that have a probability higher than the predetermined threshold value, the voice reproduction controller 105*i* reproduces them at a high rate (at twice the standard rate).

Assuming that the threshold value is set to 0.01, the combinations (1), (3), (13), (14), (16), (17), (19) and (26) of the text data are reproduced at the low rate, and the combinations (2), (4), (5), (6), (7), (8), (9), (10), (11), (12), (15), (18), (20), (21), (22), (23), (24) and (25) are reproduced at the high rate.

Subsequently, the voice reproduction controller 105*i* detects that the total time required for reproducing the units corresponding to the combinations (1), (3), (13), (14), (16), (17), (19) and (26) (which should be reproduced at the low rate, i.e., the standard rate) at the standard rate is 25 seconds.

Further, the voice reproduction controller 105*i* detects that the units corresponding to the combinations (2), (4), (5), (6), (7), (8) (9), (10), (11), (12), (15), (18), (20), (21), (22), (23), (24) and (25) (which should be reproduced at the high rate) should be reproduced in one second (=26 seconds−25 seconds). Accordingly, the voice reproduction controller 105*i* determines to reproduce these units at 27 times the standard rate.

After that, the voice reproduction controller 105*i* generates, as reproduction control data, information related to the reproduction rate for each unit. In accordance with the reproduction control data, the voice reproduction controller 105*i* converts, into an analog voice signal, the voice data input from the voice data generation device 101 so that the voice data corresponding to the units related to the combinations (1), (3), (13), (14), (16), (17), (19) and (26) is reproduced at the standard rate. At the same time, the voice reproduction controller 105*i* converts the input voice data into an analog voice signal, so that the voice data corresponding to the units related to the combinations (2), (4), (5), (6), (7), (8) (9), (10), (11), (12), (15), (18), (20), (21), (22), (23), (24) and (25) is reproduced at 27 times the standard rate. The resultant analog signal is output through the speaker 106.

As a result, the portions reproduced at 27 times the standard rate can hardly be caught by users, and only the portions reproduced at the standard rate, as shown in FIG. 26, are recognized as voice data.

As described above, in the variable voice rate apparatus of the ninth embodiment, not all voice data items are reproduced at the same rate, which differs from the prior art. Instead, all voice data items are converted into text data, and the text data is analyzed, thereby reproducing uncommon expressions at the standard rate by priority.

In the variable voice rate apparatus of the ninth embodiment, common expressions that can be easily guessed from, for example, the context are reproduced at a high rate, while uncommon expressions that are hard to guess from the context are reproduced at a low rate. This enables voice data to be reproduced sufficiently understandably, with the time required for its reproduction shortened.

Further, units of higher priority are selected from voice data so that the voice data can be reproduced within the reproduction time corresponding to the reproduction magnification N designated by a user. Thus, the voice data can be reproduced within the time designated by the user.

The invention is not limited to the ninth embodiment.

For example, in the ninth embodiment, the voice reproduction controller 105*i* classifies voice data into combinations (1) to (26) each consisting of two subsequent units, as shown in FIG. 25. However, voice data may be classified into combinations each consisting of three or more subsequent units.

Also, in the ninth embodiment, a predetermined value is used as the probability threshold value. However, if a predetermined value is set as the threshold value, and if the required total reproduction time of the units that are reproduced at a low rate exceeds the requested reproduction time based on the reproduction magnification N input through the input device 104, the voice reproduction controller 105*i* may vary the threshold value so that the total reproduction time does not exceed the requested reproduction time.

Figure 27:
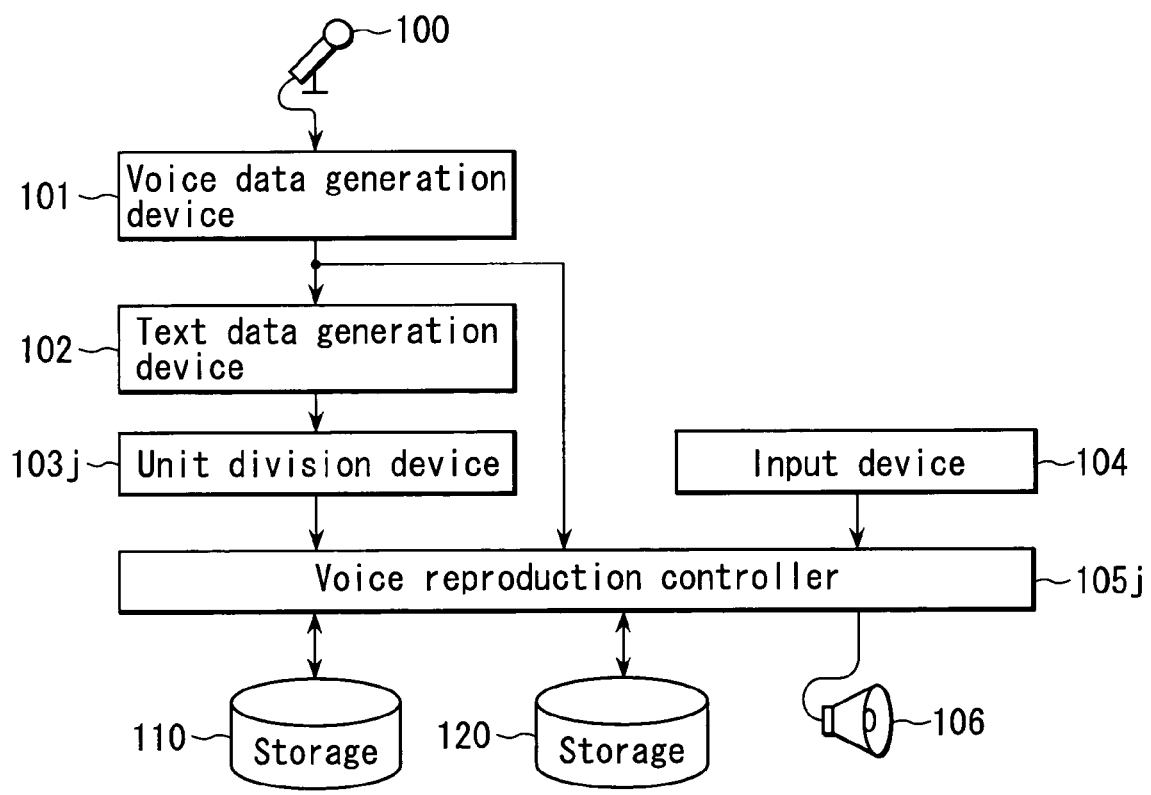
FIG. 27 is a block diagram illustrating the configuration of a variable voice rate apparatus according to a tenth embodiment of the invention.

A variable voice rate apparatus according to a tenth embodiment of the invention will be described. FIG. 27 shows the configuration of this apparatus.

The variable voice rate apparatus of FIG. 27 comprises a microphone 100, voice data generation device 101, text data generation device 102, unit division device 103*j*, input device 104, voice reproduction controller 105*j*, speaker 106 and storages 110 and 120.

The voice data generation device 101 converts, into voice data, an analog voice signal input through the microphone 100, and outputs the voice data to the text data generation device 102 and voice reproduction controller 105*j*.

The text data generation device 102 utilizes a voice recognition technique to analyze the voice data input from the voice data generation device 101, thereby converting the voice data into text data.

The unit division device 103*j* divides the text data, generated by the text data generation device 102, into units each having a linguistic function, and supplies the voice reproduction controller 105*j* with text unit data as discrimination information for discriminating each unit.

The unit having a linguistic function indicates "morpheme", "word", "basic block", "continued basic blocks", "sentence" or "paragraph".

The input device 104 accepts a reproduction magnification N input by, for example, an operator or external device as information related to the reproduction rate of voice data. The thus-input information is stored in a memory incorporated in the voice reproduction controller 105*j* described later.

When standard-rate reproduction is performed, "N=1" is input. For pausing, "N=0" is input. For slow reproduction, "0<N<1" is input. For high-rate reproduction, "1<N<∞" is input. For Skip reproduction, "N=∞" is input. For slow reverse reproduction, "−1<N<0" is input. For standard-rate reverse reproduction, "N=−1" is input. For high-rate reverse reproduction, "N<−1" is input. As "∞", it is sufficient if a sufficiently high value is set.

The voice reproduction controller 105*j* stores, into the storage 110, the voice data input from the voice data generation device 101 and the text unit data input from the unit division device 103*j*.

The storage 110 is formed of, for example, a semiconductor memory, hard disk or optical recording medium, to which the voice reproduction controller 105*h* writes data. It is desirable that the recording medium be attachable to and detachable from the variable voice rate apparatus.

Based on the text unit data, the reproduction magnification N input through the input device 104, and statistical priority information stored in the storage 120 described later, the voice reproduction controller 105*j* determines the reproduction rate of each unit of the voice data obtained by the unit division device 103*j*. The voice reproduction controller 105*j* stores, into the storage 110, the determination result as reproduction control data.

In response to a request from a user through the input device 104, the voice reproduction controller 105*j* converts, into an analog voice signal, the voice data stored in the storage 110, and outputs the signal through the speaker 106.

The storage 120 stores the above-mentioned statistical priority information. The statistical priority information indicates the probability of connection of units, which is obtained in advance from a large number of types of printed words.

Common expressions that are often used by people have high probabilities, while uncommon expressions that are not so often used have low probabilities. It is considered that an expression of a high probability, which is often used, can be easily guessed from the reproduced sound or context, even if the expression is not accurately reproduced. In contrast, it is considered that an expression of a low probability, which is not so often used, is hard to guess from the context since the expression is unique.

The operation of the variable voice rate apparatus of the tenth embodiment will be described.

The voice generated by a user is converted into an analog voice signal by the microphone 100, and input to the voice data generation device 101, where the voice signal is converted into voice data. The voice data is output to the text data generation device 102 and voice reproduction controller 105*j*.

The text data generation device 102 analyzes the voice data and converts it into text data. FIG. 24 illustrates an example of text data, into which the voice generated by a user is converted.

Subsequently, the unit division device 103*j* divides the text data into units each having a linguistic function, and supplies the voice reproduction controller 105*j* with text unit data as discrimination information for discriminating each unit.

The voice reproduction controller 105*j* stores the voice data and text unit data into the storage 110. In the description below, the voice data is divided into "basic blocks".

On the other hand, the reproduction magnification N is input through the input device 104, and sent to the voice reproduction controller 105*j*. In this embodiment, the reproduction magnification N is set to two times.

Upon receiving the reproduction magnification N from the input device 104, the voice reproduction controller 105*j* detects the reproduction time required for reproducing each basic block at the standard rate, based on the voice data and text unit data. Assume here that the total reproduction time for reproducing all the units at the standard rate is 52 seconds.

Subsequently, the voice reproduction controller 105*j* computes a reproduction time based on a request from a user. In this embodiment, since the reproduction magnification N is 2 and the detected total reproduction time is 52 seconds, the voice reproduction controller 105*i* determines that the requested reproduction time is within 26 seconds.

Further, based on the text unit data, the voice reproduction controller 105*j* classifies the text data, as shown in FIG. 24, into combinations (1) to (26) of two continuous units as shown in FIG. 25. After that, the controller 105*j* determines the probability of each of the combinations (1) to (26), referring to the statistic priority information stored in the storage 120.

Concerning those of the combinations (1) to (26) that have a probability not higher than a predetermined threshold value, the voice reproduction controller 105*j* reproduces them at a low rate (standard rate). On the other hand, concerning those of the combinations (1) to (23) that have a probability higher than the predetermined threshold value, the voice reproduction controller 105*j* reproduces them at a high rate (at twice the standard rate).

Assuming that the threshold value is set to 0.01, the combinations (1), (3), (13), (14), (16), (17), (19) and (26) of the text data are reproduced at the low rate, and the combinations (2), (4), (5), (6), (7), (8) (9), (10), (11), (12), (15), (18), (20), (21), (22), (23), (24) and (25) are reproduced at the high rate.

Subsequently, the voice reproduction controller 105*j* detects that the total time required for reproducing the units corresponding to the combinations (1), (3), (13), (14), (16), (17), (19) and (26) (which should be reproduced at the low rate, i.e., the standard rate) at the standard rate is 25 seconds. Further, the voice reproduction controller 105*i* detects that the units corresponding to the combinations (2), (4), (5), (6), (7), (8) (9), (10), (11), (12), (15), (18), (20), (21), (22), (23), (24) and (25) (which should be reproduced at the high rate) should be reproduced in one second (=26 seconds−25 seconds). Accordingly, the voice reproduction controller 105*j* determines to reproduce these units at 27 times the standard rate.

The above-described information related to the reproduction rate of each unit is stored as reproduction control data in the storage 110.

When a user has issued a request through the input device 104, the voice reproduction controller 105*j* converts the voice data, input from the voice data generation device 101, into an analog voice signal based on the reproduction control data stored in the storage 110. This conversion is performed so that the voice data corresponding to the units related to the combinations (1), (3), (13), (14), (16), (17), (19) and (26) is reproduced at the standard rate, and the voice data corresponding to the units related to the combinations (2), (4), (5), (6), (7), (8) (9), (10), (11), (12), (15), (18), (20), (21), (22), (23), (24) and (25) is reproduced at 27 times the standard rate. The resultant analog signal is output through the speaker 106.

As a result, the portions reproduced at 27 times the standard rate can hardly be caught by users, and only the portions reproduced at the standard rate, as shown in FIG. 26, are recognized as voice data.

As described above, in the variable voice rate apparatus of the ninth embodiment, not all voice data items are reproduced at the same rate, which differs from the prior art. Instead, all voice data items are converted into text data, and this text data is analyzed, thereby reproducing uncommon expressions at the standard rate by priority.

In the variable voice rate apparatus of the ninth embodiment, common expressions that can be easily guessed from, for example, the context are reproduced at a high rate, while uncommon expressions that are hard to guess from the context are reproduced at a low rate. This enables voice data to be reproduced sufficiently understandably, with the time required for its reproduction shortened.

Further, units of higher priority are selected from voice data so that the voice data can be reproduced within the reproduction time corresponding to the reproduction magnification N designated by a user. Thus, the voice data can be reproduced within the time designated by the user.

Furthermore, in the variable voice rate apparatus of the tenth embodiment, information indicative of the reproduction rate of each unit is stored as reproduction control data in the storage 110 together with voice data. In response to a request made by a user, voice data is reproduced based on the reproduction control data.

Thus, in the variable voice rate apparatus of the tenth embodiment, since information indicative of the reproduction rate of each unit is stored together with voice data, before reproduction, prompt reproduction of voice data can be performed in response to a request from a user.

Further, the recording medium included in the storage 110 can record the above-described information that enables voice data to be reproduced at high speed without reducing the level of aural comprehension thereof. If another reproduction apparatus incorporates this recording medium, it can also realize high-speed reproduction.

The invention is not limited to the tenth embodiment.

For example, in the tenth embodiment, the text data generation device 102 analyzes the content of voice data utilizing a voice recognition technique, and converts it into text data.

Instead of this, the text data generation device 102 may be formed of a loudspeaker and text input device. The loudspeaker outputs, to an operator, voice corresponding to voice data. Upon recognizing this voice, the operator inputs, to the text input device, a text corresponding to the voice, using a keyboard, for example. The text input device outputs text data corresponding to the input text.

Further, text data may be formed based on voice data input from a CD or DVD, instead of voice input through a microphone. In other words, voice data may be input via a recording medium or network, without using a microphone, and may be used to generate division information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A variable voice rate apparatus to control a reproduction rate of voice, comprising:
    a voice data generation unit configured to generate voice data from the voice;
    a text data generation unit configured to generate text data indicating a content of the voice data, based on the generated voice data;
    a division information generation unit configured to generate division information used for dividing the text data into a plurality of linguistic units each of which is characterized by a linguistic form;
    a reproduction information generation unit configured to generate, as reproduction information concerning reproduction control of the voice for each of linguistic units, information indicating a probability with which preset ones of the linguistic units are combined in a preset order; and
    a voice reproduction controller which selects, from the linguistic units, combinations of linguistic units each having a probability lower than a preset value, based on the reproduction information and the division information, and controls reproduction of the voice data corresponding to the selected combinations.

2. The variable voice rate apparatus according to claim 1, further comprising a detection unit configured to detect each time for reproducing each of the linguistic units,
    wherein the voice reproduction controller selects, from the linguistic units, combinations of linguistic units each having a probability lower than a preset value, based on the reproduction information and the division information, a total time for reproducing the linguistic units being not more than a preset time, and controls reproduction of the voice data corresponding to the selected combinations.

3. A variable voice rate apparatus to control a reproduction rate of voice, comprising:
    a voice data generation unit configured to generate voice data from the voice;
    a text data generation unit configured to generate text data indicating a content of the voice data, based on the generated voice data;
    a division information generation unit configured to generate division information used for dividing the text data into a plurality of linguistic units each of which is characterized by a linguistic form;
    a reproduction information generation unit configured to generate, as reproduction information concerning reproduction control of the voice for each of linguistic units, information indicating a probability with which preset ones of the linguistic units are combined in a preset order;
    a first storage which stores the reproduction information; and
    a voice reproduction controller which selects, from the linguistic units, combinations of linguistic units each having a probability lower than a preset value, based on the stored reproduction information and the division information, and controls reproduction of the voice data corresponding to the selected combinations.

4. The variable voice rate apparatus according to claim 3, further comprising a detection unit configured to detect each time for reproducing each of the linguistic units,
    wherein
    the voice reproduction controller selects, from the linguistic units, combinations of linguistic units each having a probability lower than a preset value, based on the stored reproduction information and the division information, a total time for reproducing the linguistic units being not more than a preset time, and controls reproduction of the voice data corresponding to the selected combinations.

5. A variable voice rate apparatus to control a reproduction rate of voice, comprising:
    a voice data generation unit configured to generate voice data from the voice;
    a text data generation unit configured to generate text data indicating a content of the voice data, based on the generated voice data;
    a division information generation unit configured to generate division information used for dividing the text data into a plurality of linguistic units each of which is characterized by a linguistic form;
    a reproduction information generation unit configured to generate, as reproduction information concerning reproduction control of the voice for each of linguistic units, information indicating a probability with which preset ones of the linguistic units are combined in a preset order;

a first storage which stores the reproduction information;

a second storage which stores the voice data and the division information; and a voice signal selection unit configured to select, from the linguistic units, combinations of linguistic units each having a probability lower than a preset value, based on the stored reproduction information and the stored division information, and generates a voice signal, based on the voice data corresponding to the selected combinations.

6. The variable voice rate apparatus according to claim 5, further comprising a detection unit configured to detect each time for reproducing each of the linguistic units, wherein the voice signal selection unit selects, from the linguistic units, combinations of linguistic units each having a probability lower than the preset value, based on the stored reproduction information and the stored division information, a total time for reproducing the linguistic units being not more than a preset time, and generates a voice signal, based on the voice data corresponding to the selected combinations.

7. A variable voice rate method of controlling a reproduction rate of voice, comprising:

generating voice data from the voice;

generating text data indicating a content of the voice data, based on the generated voice data;

generating division information used for dividing the text data into a plurality of linguistic units each of which is characterized by a linguistic form;

generating, as reproduction information concerning reproduction control of the voice for each of linguistic units, information indicating a probability with which preset ones of the linguistic units are combined in a preset order;

selecting, from the linguistic units, combinations of linguistic units each having a probability lower than a preset value, based on the reproduction information and the division information; and controlling reproduction of the voice data corresponding to the selected combinations.

* * * * *